(12) United States Patent
Longley et al.

(10) Patent No.: US 8,113,526 B2
(45) Date of Patent: Feb. 14, 2012

(54) LINEAR TRAVEL SUSPENSION SYSTEM

(75) Inventors: Jonathan T. Longley, Andover, MA (US); Brian R. Boule, Woburn, MA (US)

(73) Assignee: Raytheon Company, Waltham, MA (US)

( * ) Notice: Subject to any disclaimer, the term of this patent is extended or adjusted under 35 U.S.C. 154(b) by 105 days.

(21) Appl. No.: 12/419,659

(22) Filed: Apr. 7, 2009

(65) Prior Publication Data
US 2010/0253031 A1    Oct. 7, 2010

(51) Int. Cl.
*B60G 3/01* (2006.01)
(52) U.S. Cl. .................................................. 280/124.127
(58) Field of Classification Search ........... 280/124.127, 280/124.154, 6.151, 6.153, 6.155
See application file for complete search history.

(56) References Cited

U.S. PATENT DOCUMENTS

| | | | |
|---|---|---|---|
| 2,148,606 A | 2/1939 | Chamberlain | |
| 2,299,926 A | 10/1942 | Phelps | |
| 3,024,039 A | 3/1962 | Zeigler et al. | |
| 3,123,350 A | 3/1964 | Zeigler et al. | |
| 3,333,653 A | 8/1967 | Eirhart, Jr. | |
| 3,927,900 A * | 12/1975 | Wischmeier | 280/124.127 |
| 4,360,220 A * | 11/1982 | Beers | 280/677 |
| 4,836,564 A * | 6/1989 | Heims | 404/84.05 |
| 4,878,691 A | 11/1989 | Cooper et al. | |
| 4,934,733 A * | 6/1990 | Smith et al. | 280/124.132 |
| 6,017,044 A | 1/2000 | Kawagoe | |
| 6,357,770 B1 | 3/2002 | Carpiaux et al. | |
| 7,347,436 B1 * | 3/2008 | Fawcett | 280/124.127 |
| 7,775,529 B2 * | 8/2010 | Kinkaide | 280/6.153 |
| 2004/0112661 A1 | 6/2004 | Royle | |

* cited by examiner

*Primary Examiner* — Faye M. Fleming
(74) *Attorney, Agent, or Firm* — Lando & Anastasi, LLP

(57) ABSTRACT

Suspension systems and methods of assembling suspension systems for weight-bearing structures are presented. The suspension system can have linearly translating load-bearing or load support members that confine displacement of a weight-bearing body or member to a longitudinal axis or displacement axis rather than a lateral axis or not coincident with the longitudinal axis, comprising a rail and bridge assembly. The linear bearing assembly can comprise a rail and a bridge slidably movable along the longitudinal axis of the rail.

20 Claims, 8 Drawing Sheets

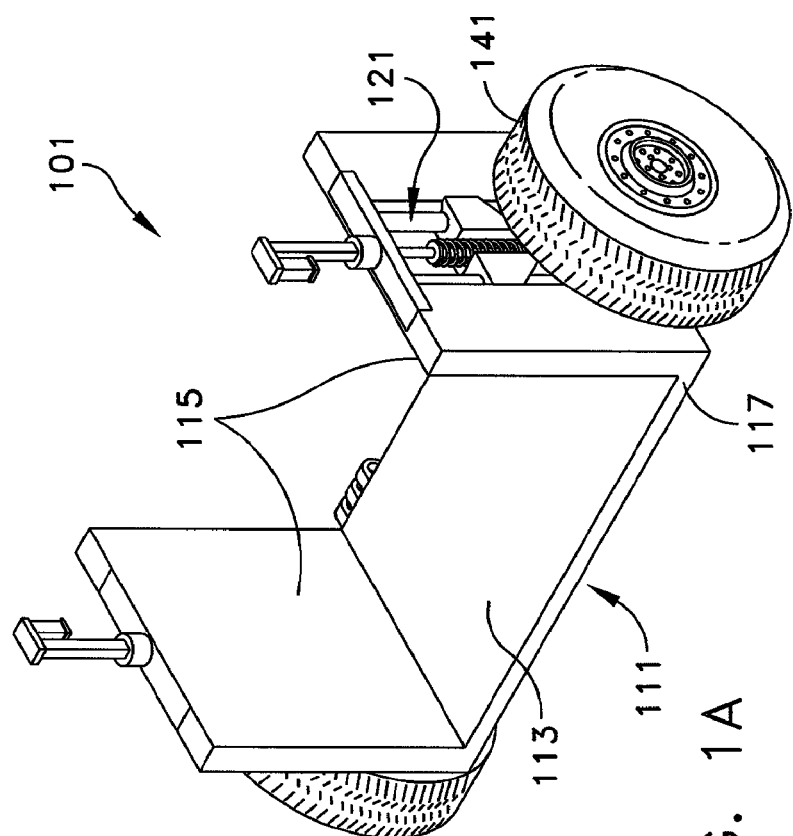
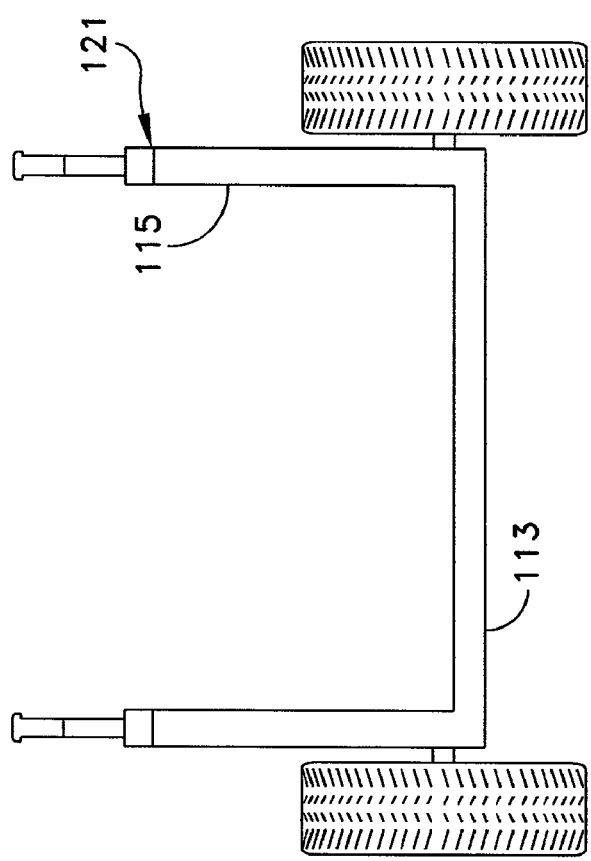
FIG. 1A
FIG. 1B

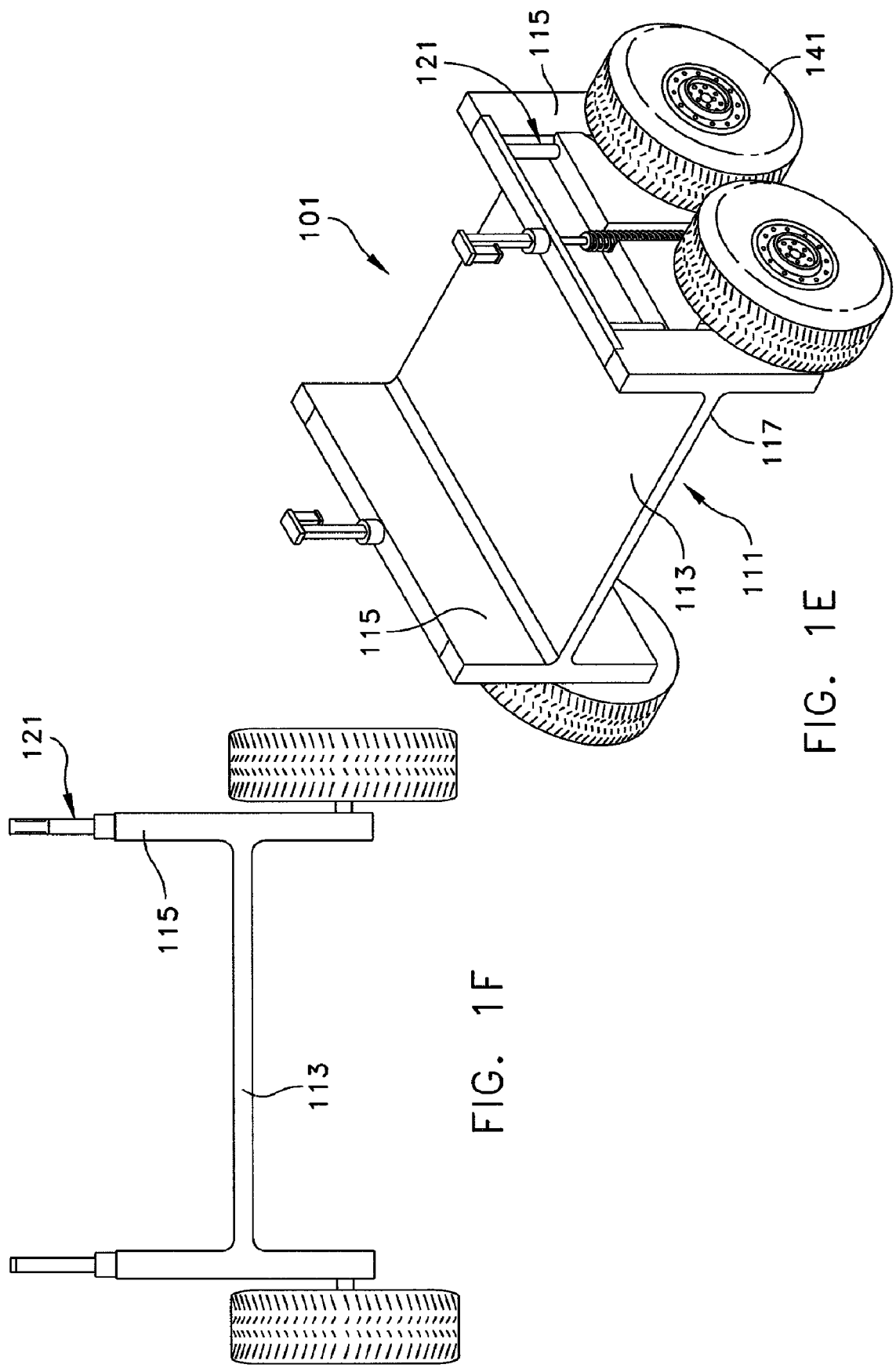

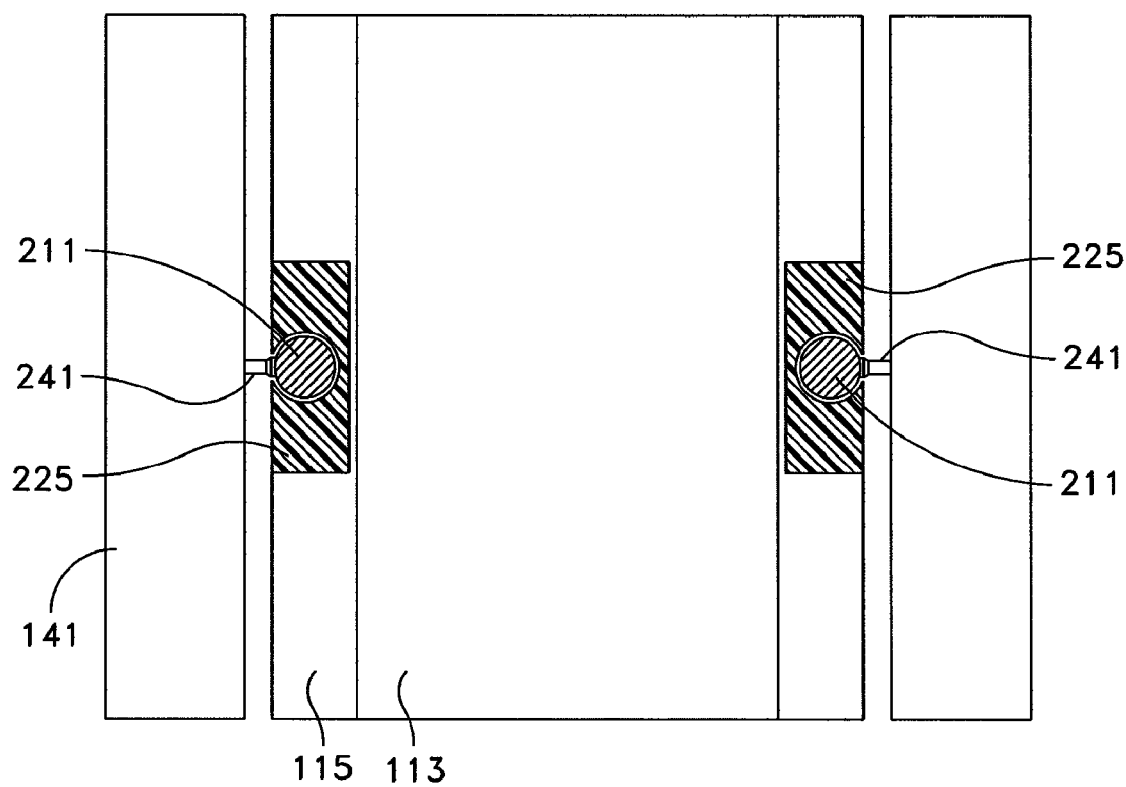
FIG. 3
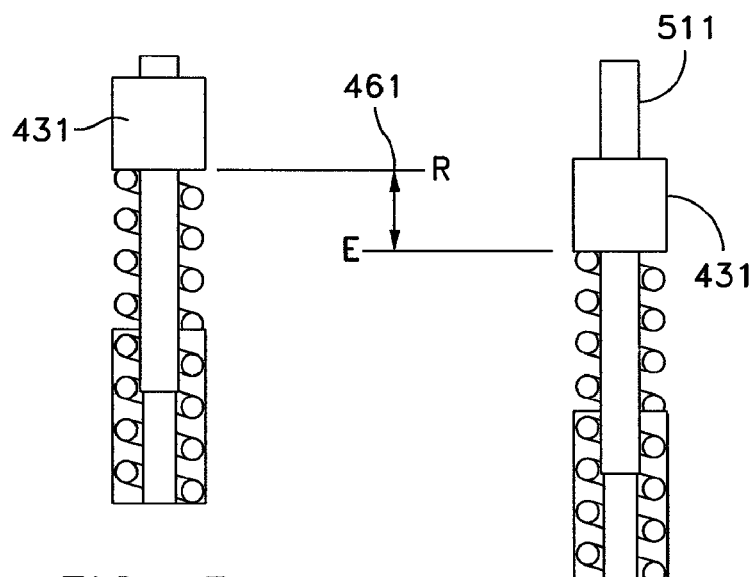
FIG. 5A
FIG. 5B

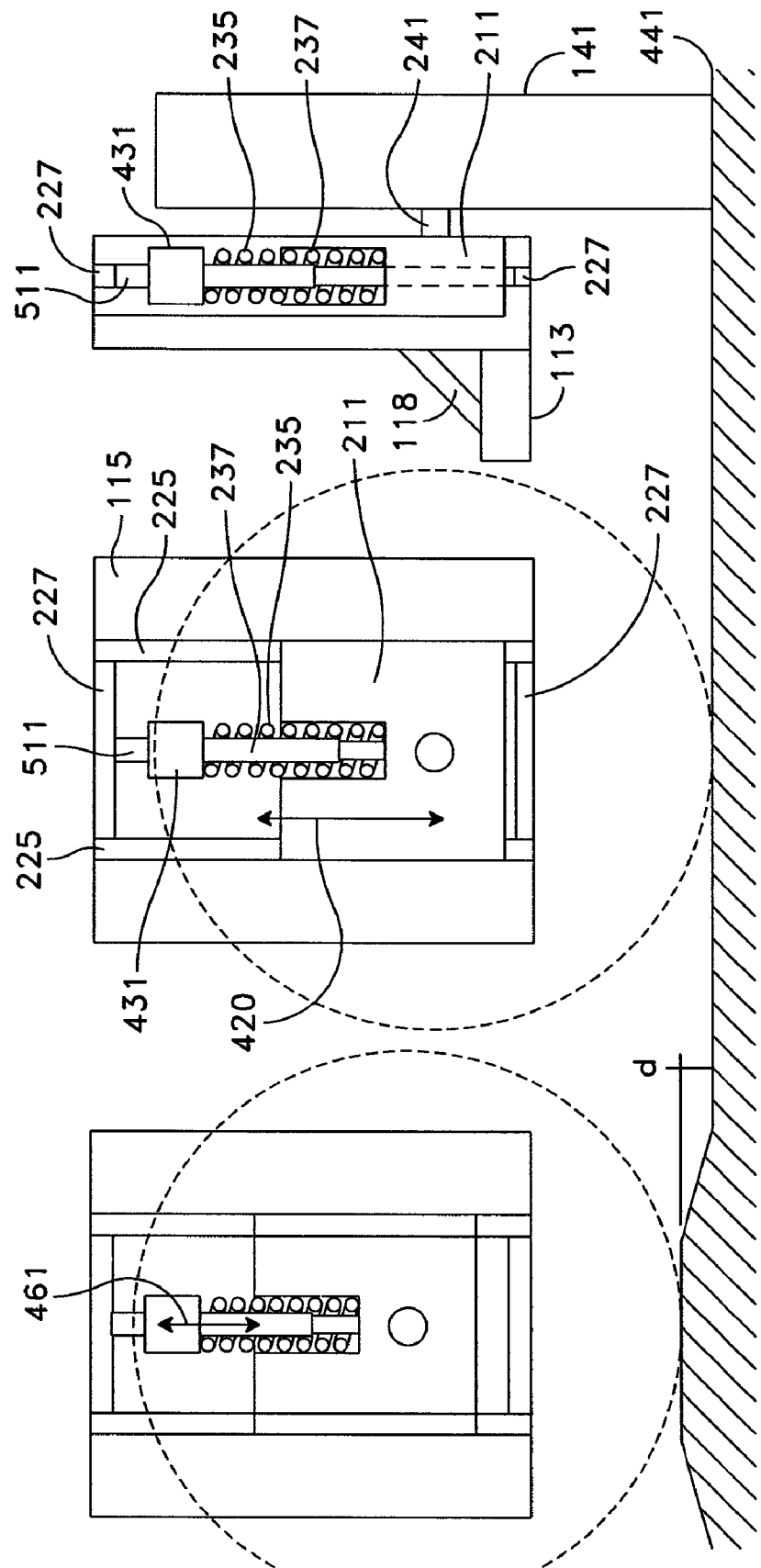

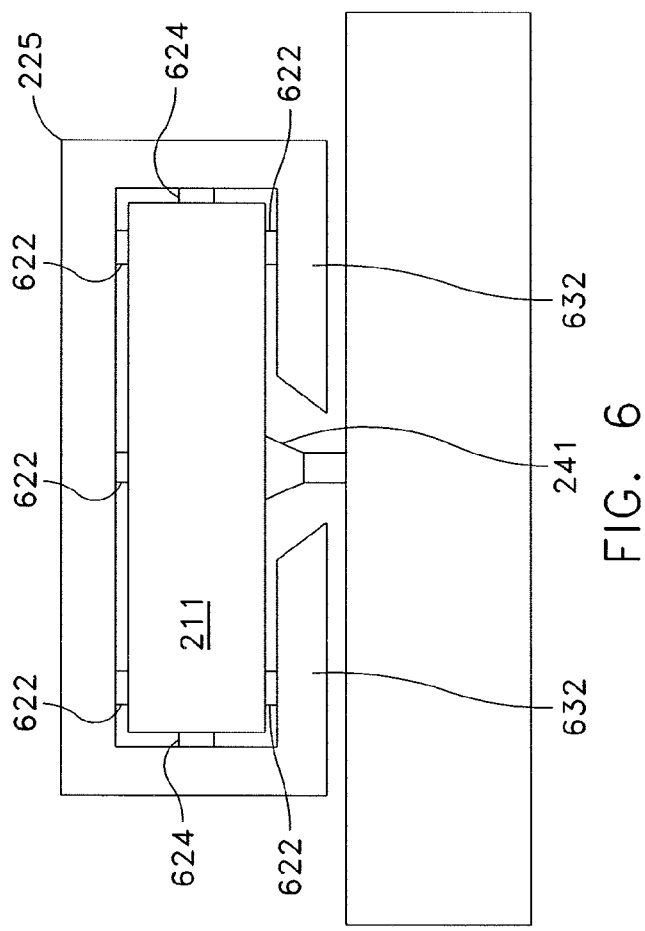
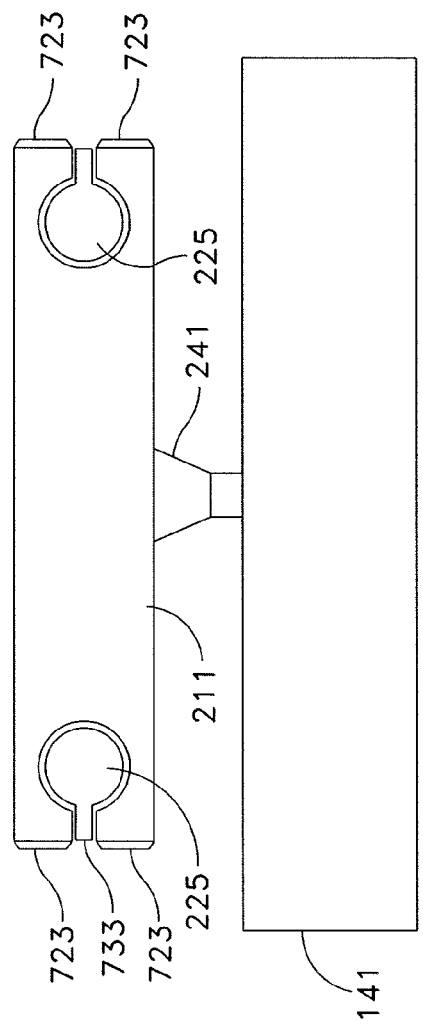

LINEAR TRAVEL SUSPENSION SYSTEM

BACKGROUND OF THE INVENTION

1. Field of Invention

This disclosure relates to suspension systems, components thereof and to methods of assembly, and, in particular, to vehicle suspension systems having linearly movable assemblies.

2. Discussion of Related Art

Chamberlain, in U.S. Pat. No. 2,148,606, discloses a mounting for independently sprung front wheels of automotive vehicles.

Phelps, in U.S. Pat. No. 2,299,926, discloses an automotive suspension.

Ziegler et al., in U.S. Pat. No. 3,024,039, disclose a unitized sliding pillar rear suspension.

Ziegler et al., in U.S. Pat. No. 3,123,350, disclose an arcuate sliding pillar independent wheel suspension.

Eirhart, Jr., in U.S. Pat. No. 3,333,653, discloses a spindle ball guide independent suspension system.

Cooper et al., in U.S. Pat. No. 4,878,691, disclose a trailer suspension apparatus.

Smith et al., in U.S. Pat. No. 4,934,733, disclose another trailer suspension apparatus.

Kawagoe, in U.S. Pat. No. 6,017,044, discloses an automobile suspension system.

Royle, in U.S. Patent Application Publication No. 2004/0112661 discloses a vehicle with retractable wheels.

SUMMARY OF THE INVENTION

One or more aspects of the disclosure pertain to a suspension system comprising a linear bearing assembly having a rail assembly and a load support member slidably engaged with the rail assembly along a linear displacement axis of the rail assembly; and a spring having a first spring end configured to be coupled to the load support member, and a second spring end.

One or more aspects of the disclosure pertain to a vehicle suspension system comprising a wheel support member; confining means for confining translational forces to along a linear displacement axis associated with movement of the wheel, a spring having a first spring end configured to be coupled to the wheel support member, and a shock absorber configured to be coupled to the wheel support member.

One or more aspects of the disclosure pertain to a method of assembling a suspension system comprising providing a linear bearing assembly having no pivoting members; the linear bearing assembly comprising a rail assembly, a load support member slidably coupled to the rail assembly, the load support member movable along a linear longitudinal or displacement axis of the rail assembly, a shock absorber having a first end and a second end, the first end configured to be coupled to the load support member, and a spring assembly having a first spring end and a second spring end, the first spring end configured to be coupled to the load support member.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing.

In the drawings:

FIGS. 1A and 1B are schematic illustrations showing a perspective view (FIG. 1A) and an elevation view (FIG. 1B) of a suspension system, in accordance with one or more aspects of the present disclosure;

FIGS. 1E and 1F are schematic illustrations showing a perspective view (FIG. 1E) and an elevation view (FIG. 1F) of a suspension system having a plurality of wheels and an H-shaped member, in accordance with one or more aspects of the present disclosure;

FIG. 3 is a schematic illustration showing a top plan view of a suspension system, in accordance with one or more aspects of the present disclosure;

FIGS. 4A to 4C are schematic illustrations showing a side elevation view (FIG. 4A), an end elevation view (FIG. 4B), and another side elevation view (FIG. 4C), in accordance with one or more aspects of the disclosure;

FIGS. 5A and 5B are schematic illustrations of a portion of a suspension assembly in a retracted configuration (FIG. 5A) and in an extended configuration (FIG. 5B), in accordance with one or more aspects of the present disclosure;

FIG. 6 is a schematic illustration of a portion of a suspension system showing a single rail embodiment, in accordance with one or more embodiments of the present disclosure;

FIG. 7 is a schematic illustration of a portion of a suspension system showing a dual rail embodiment, in accordance with one or more embodiments of the present disclosure.

DETAILED DESCRIPTION

Figure 1C:
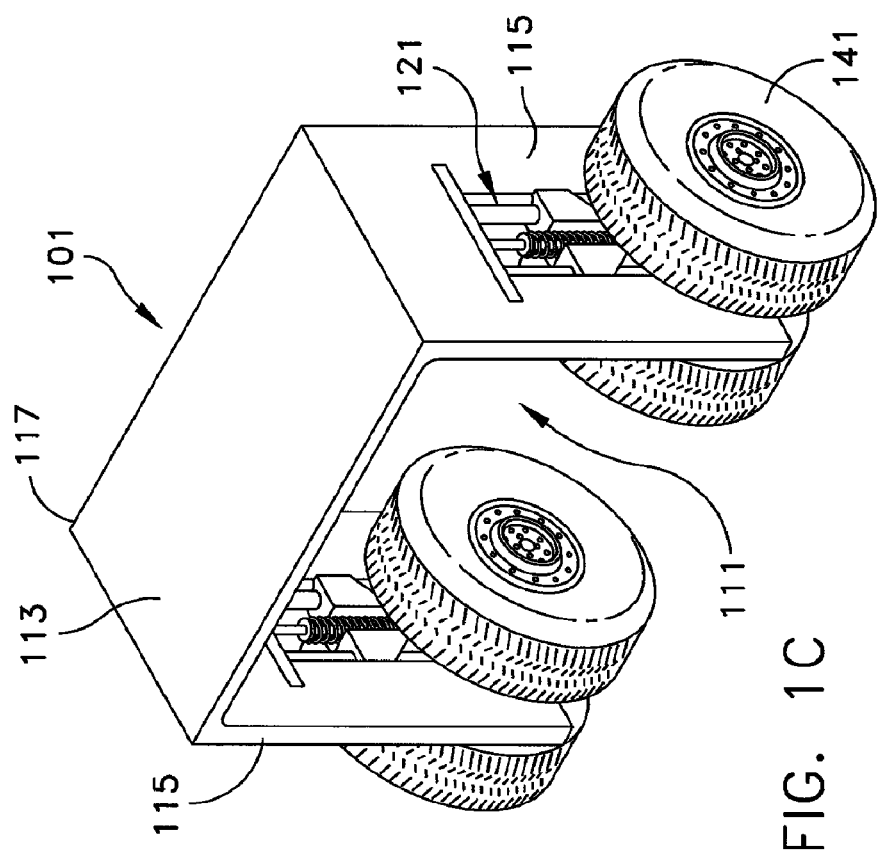
FIGS. 1C and 1D are schematic illustrations showing a perspective view (FIG. 1C) and an elevation view (FIG. 1D) of a suspension system having a plurality of wheels and an inverted U-shaped member, in accordance with one or more aspects of the present disclosure.
Figure 1D:
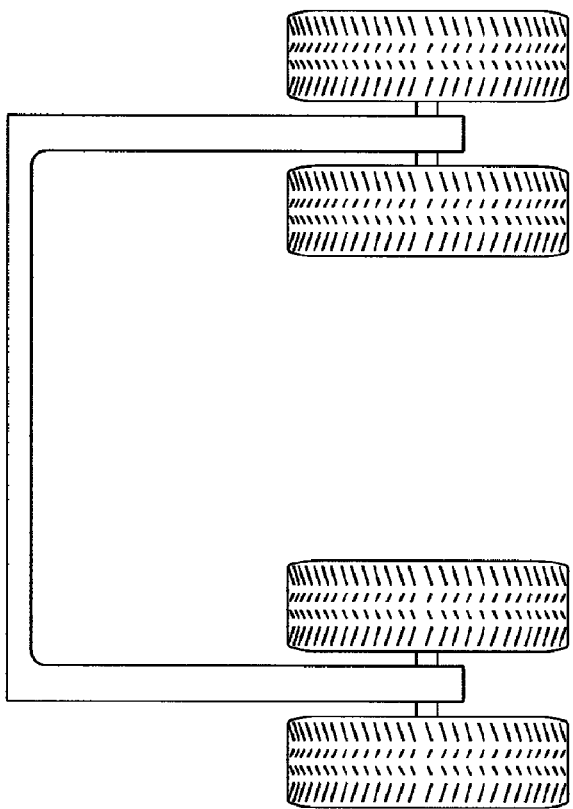

The present disclosure provides suspension systems and methods of assembling suspension systems for weight-bearing structures. The suspension systems and assemblies of the present disclosure can be utilized, for example, in vehicles, trailers, and other load platforms such as, but not limited to floors, seats, and chairs. One or more configurations or versions of the suspension systems of the present disclosure can have linearly translating load-bearing or load support members that confine displacement of a weight-bearing body or member to a preferred, displacement axis rather than a lateral axis that is not coincident or parallel the longitudinal axis or the displacement axis. As used herein, lateral displacement of a member, such as a load support member, refers to movements of such members along a direction or axis other than a displacement axis, such as a linear displacement axis. Typically, some or all embodiments provide subassemblies that confine displacement of components along a preferred axis, such as the displacement axis, while limiting or at least reducing displacement along other than the preferred axis, e.g., along one or more lateral axes. Some embodiments of the present disclosure can further comprise components affixed or coupled to a frame assembly without pivoting or articulating load-bearing components or sub-assemblies or components coupled to a pivotable or articulatable component. The suspension systems can have less occupied volumes, relative to conventional suspension systems that utilize pivoting components. Various aspects can also pertain to configurations having no arcuate axis, or components thereof that translate along an arcuate axis. For example, one or more of the translating load bearing components can be confined to travel along a linear, or straight axis, rather than an arcuate or curved axis. As used herein, a pivoting element is a member or component is that has at least a portion thereof rotatable around a point or axis by more a predetermined angular displacement. In contrast, movable, non-pivoting elements translate along a displacement axis but are not rotatable around a fixed point or pivot axis. The predetermined angular displacement can be 2.5° or less. In other cases, non-pivoting members do not displace about a point by more than 1.5°. However, other cases can involve a predetermined angular displacement of ±1°. In further cases, the non-pivoting member can displace about a point in a range of 0° to less than 2.5°, or less than 1°.

Further embodiments can involve independent suspension assemblies that have height adjustable load-bearing components or sub-assemblies. Still further embodiments can provide vehicles that have a load-bearing floor surface that is at a lower elevation relative to a projected axle of the vehicle. Other embodiments can involve suspension systems or frame assemblies that isolate, de-couple, or dampen shock forces from road and wheel vibrations from the vehicle or frame thereof. Still other embodiments can involve vehicle suspension systems that utilize an assembly comprising one or more rails and bridges to transfer or control vertical, lateral, and transverse forces.

One or more aspects of the disclosure pertain to suspension systems comprising at least one linear bearing assembly, preferably coupled to or at least configured to be coupled to a frame assembly, the at least one bearing assembly can have at least one rail; and at least one load support member slidably engaged with the rail assembly an axis, preferably a linear longitudinal or displacement axis, thereof; and one or more springs typically having a first spring end coupled or configured to be coupled to at least one load support member. The spring can also have a second spring end configured to be or coupled to at least one of the frame assembly and the rail assembly. The suspension system can further comprise one or more shock absorbers, or force dampening elements. The one or more shock absorbers typically having a first end configured to be or coupled to the load support member, and a second end likewise configured to be or coupled to at least one of the frame assembly and the rail assembly. The suspension system can further comprise, in some cases, a load platform coupled to the load support member. The load platform can comprise at least one of a chair, a wheel, a wheel support member, and other structures configured to bear a weight thereon. The frame assembly can comprise a horizontal frame support member, and at least one vertical frame or suspension support member, which is typically oriented perpendicularly to the horizontal suspension support member. The suspension system can further comprise a spring positioning assembly secured to or at least configured to be secured to at least one of the spring, the rail assembly, and the frame assembly. The positioning assembly can comprise an actuatable member having a first mounting end configured to be or coupled to at least one of the spring and the load support member, and a second mounting end configured to be or coupled to the frame assembly through, for example, the rail assembly. For example, the positioning assembly can have an actuatable member that is coupled to at least one of the frame assembly and the rail assembly. The system can further comprise a suspension control system configured to be operatively coupled to the spring positioning assembly. The system can also comprise a position sensor disposed to provide an indication of a position of at least one of the load support member, the wheel, the first spring end and the second spring end, such as along the displacement axis or the longitudinal axis. At least one of, and more preferably, each of the load support member, the shock absorber, and the spring is configured to be or coupled to other components of the suspension system without a pivoting element or member.

The dampening forces of the one or more shock absorbing components, or force dampening elements, can be oriented along a direction that is preferably the displacement axis. In other configurations, however, at least a portion of the dampening forces are non-parallel the displacement axis. The shock absorber typically dampens and, can also dissipate, at least a portion of any shock impulse directed to the load support member. Shock absorbers can be pneumatic, hydraulic, or a combination thereof, with viscous working fluids in, for example, hydraulic cylinders. Magnetic shock absorbers that utilize eddy current dashpot dampeners can also be utilized.

The reactive forces of the one or more springs or reactive components of the can be along a direction that is preferably the displacement axis. In other configurations, however, at least a portion of the dampening forces are non-parallel the displacement axis.

The positioning assembly can be incorporated into or within the shock absorber. For example, the composite hydraulic or pneumatic devices can be utilized to absorb shock forces and can further be utilized to adjust a position of the suspension system.

One or more aspects of the disclosure pertain to a vehicle having a floor surface, and comprising a suspension frame assembly having a horizontal frame support member that can be oriented substantially parallel at least a portion of the floor, and at least one vertical suspension support member secured to an end of the horizontal suspension support member; a bridge slidably coupled to the at least one vertical suspension support member, the bridge movable along a displacement axis oriented perpendicular the floor; a spring assembly having a first spring end configured to be or coupled to the movable bridge, and a second spring end distal from the first spring end, the second spring end configured to be or coupled to the suspension frame assembly; and a shock absorber having a first end configured to be or coupled to the movable bridge, and a second end distal from the first end, the second end configured to be or coupled to the suspension frame assembly. The bridge typically comprises at least one stub axle extending perpendicularly from an outer surface thereof. The vehicle can further comprise a spring positioning assembly secured to the vertical suspension support member or to a rail assembly. The spring positioning assembly can comprise a spring seat and an actuatable member having a first mounting end configured to be or coupled to the spring seat and a second mounting end configured to be or coupled to the at least one vertical frame support member. The second spring end can be configured to be or can be secured or coupled to the spring seat. The vehicle can further comprise a suspension control system operatively coupled to the spring positioning assembly, such that the suspension control system is configured to adjust an extension displacement of the actuatable member between a retracted position and an extended position. The vehicle can further comprise a position sensor disposed to provide an indication of a relative position of the bridge along the displacement axis. The bridge is typically coupled to the suspension frame assembly without a pivoting member. The vehicle can further comprise at least one rail, each of which preferably having each end thereof secured to the at least one vertical suspension support member. The at least one rail, however, can be configured to be or secured, or coupled, to the at least one suspension support member at locations other than ends thereof. The bridge is typically coupled to the rail and is slidably movable along at least a portion of a length of the rail. The bridge can comprise a plurality of bearing assemblies, each of the bearing assemblies can be disposed against a running surface of the rail, or even one or more rails.

One or more aspects of the disclosure pertain to a suspension system comprising at least one wheel or a wheel support member; confining means for confining translational forces along a displacement axis associated with or generated during movement of the wheel during, for example, propulsion of a vehicle having such suspension system; reactive means for generating reactive forces responsive to the translational forces along the displacement axis; and dampening means for dampening the translational forces coupled to the wheel and, for example, a vehicle frame assembly. In some embodiments, the means for confining translational forces can comprise a linear bearing assembly having a linear guide member, such as one or more rails, and a load support member coupled to the linear guide member and slidable along a longitudinally axis of the linear guide member, or along a displacement axis that is parallel the longitudinal axis. The suspension system can further comprise means for adjusting a height of the frame or a position of the wheel relative to a vehicle frame coupled to the linear bearing assembly.

One or more aspects of the disclosure pertain to a method of assembling a suspension system comprising providing a linear bearing assembly having a rail, a load support member slidably coupled to the rail, the load support member movable along an axis, such as a linear displacement axis or linear longitudinal axis, of the rail, a shock absorber having a first end and a second end, the first end typically configured to be or coupled to the load support member; and a spring assembly having a first spring end and a second spring end, the first spring end typically configured to be or coupled to the movable load support member. The method can further comprise securing at least one wheel to the load support member. The method can also further comprise providing a frame assembly, coupling the second spring end to at least one of the frame assembly and the rail assembly, coupling the second end of the shock absorber to at least one of the rail assembly and the frame assembly. In some cases, the method can also further comprise coupling a spring positioning assembly to at least one of the rail assembly and the frame assembly. The method can also further comprise coupling a spring position controller to the spring positioning assembly. The method can also further comprise coupling the spring position controller to at least one suspension position sensor, the at least one suspension position sensor configured to provide an indication of a position of at least one of the load support member, the first spring end, second spring end, the first end of the shock absorber, the second end of the shock absorber and at least one of the at least one wheel. The linear bearing assembly typically does not have a pivoting member and has linear, non-arcuate displacement axis.

One or more aspects of the disclosure pertain to supporting a mass in a vehicle having a frame, comprising securing a suspension system to the frame, the suspension system having a rail assembly and a load support member slidably coupled to the rail assembly along a displacement axis of the rail assembly, which is preferably a linear, non-arcuate axis, a position biasing assembly coupled to the load support member and to at least one of the rail assembly and the frame, the position biasing assembly operatively configured to position the load support member toward a first position of the displacement axis, a dampening assembly configured to be or coupled to the load support member at a first end thereof, and to at least one of the rail assembly and the frame at a second end thereof, and a wheel or wheel support member configured to be or coupled to the load support member; and positioning the mass on the frame. The position biasing assembly can comprise a spring such as a coiled spring, having a first spring end configured to be or coupled to the load support member, and a second spring end configured to be or coupled to the frame.

One or more aspects of the disclosure pertain to operating a vehicle having a loaded weight, comprising supporting at least a portion of a weight of the vehicle through a suspension system coupled to a frame of the vehicle, the suspension system comprising a rail assembly and a load support member slidably coupled to the rail assembly along a displacement axis, which is typically parallel a longitudinal axis of the rail assembly, and a wheel coupled to the load support member; and propelling the vehicle over a surface. The vehicle can be self-propelled or dependently propelled. Operating the vehicle can comprise adjusting a height of the vehicle, typically relative to the surface. In the method of operating the vehicle, supporting at least a portion of the weight of the vehicle typically comprise reducing any lateral displacement of a wheel coupled to the suspension system relative to the frame while providing vertical displacement of load support member along a linear, non-arcuate axis. In operating the vehicle, supporting at least a portion of the weight of the vehicle typically comprises dampening reactive forces generated during propulsion of the vehicle, through a dampening assembly coupled to the slidable load support member and to the frame. Operating the vehicle can further comprise biasing a position of the load support member with a position biasing assembly coupled to the load support member and to the frame.

Some aspects of the disclosure involve suspension systems with linear bearing assemblies that confine displacement of, for example, a wheel coupled thereto, as well as a load support member, along a preferred axis while reducing translational displacement or movement along any other axis. The preferred axis is typically linear and non-arcuate. Thus, preferred configurations can involve linear bearing assemblies having one or more load support members translatable along a displacement or longitudinal axis, illustrated as a vertical z-axis in FIG. 2, while reducing any translational displacement along any of the x-axis and the y-axis.

Securing or coupling any of the various members of the suspension systems of the disclosure can be effected by conventional techniques such as those that provide a permanent assembly, e.g., by welding or by means of an adhesive bond, or a removable assemblage, e.g., by bolts or other threaded and non-threaded fasteners.

FIGS. 1A-1F exemplarily show suspension systems 101 in accordance with one or more aspects of the disclosure. Suspension system 101 can comprise a frame assembly 111 having a horizontal frame support member 113, and at least one vertical suspension support member or vertical frame support member 115, which can be secured to horizontal frame member 113 at an end 117 thereof. Preferred configurations of the system can involve one or more wheels 141 secured or coupled to member 115 through one or more linear bearing assemblies 121.

One or more optional braces or struts 118, illustrated in FIG. 4B, may be utilized to brace the frame members. Strut 118 may be secured to the horizontal and vertical frame members, as illustrated, to the each of the vertical frame members, or to all frame members.

Figure 2:
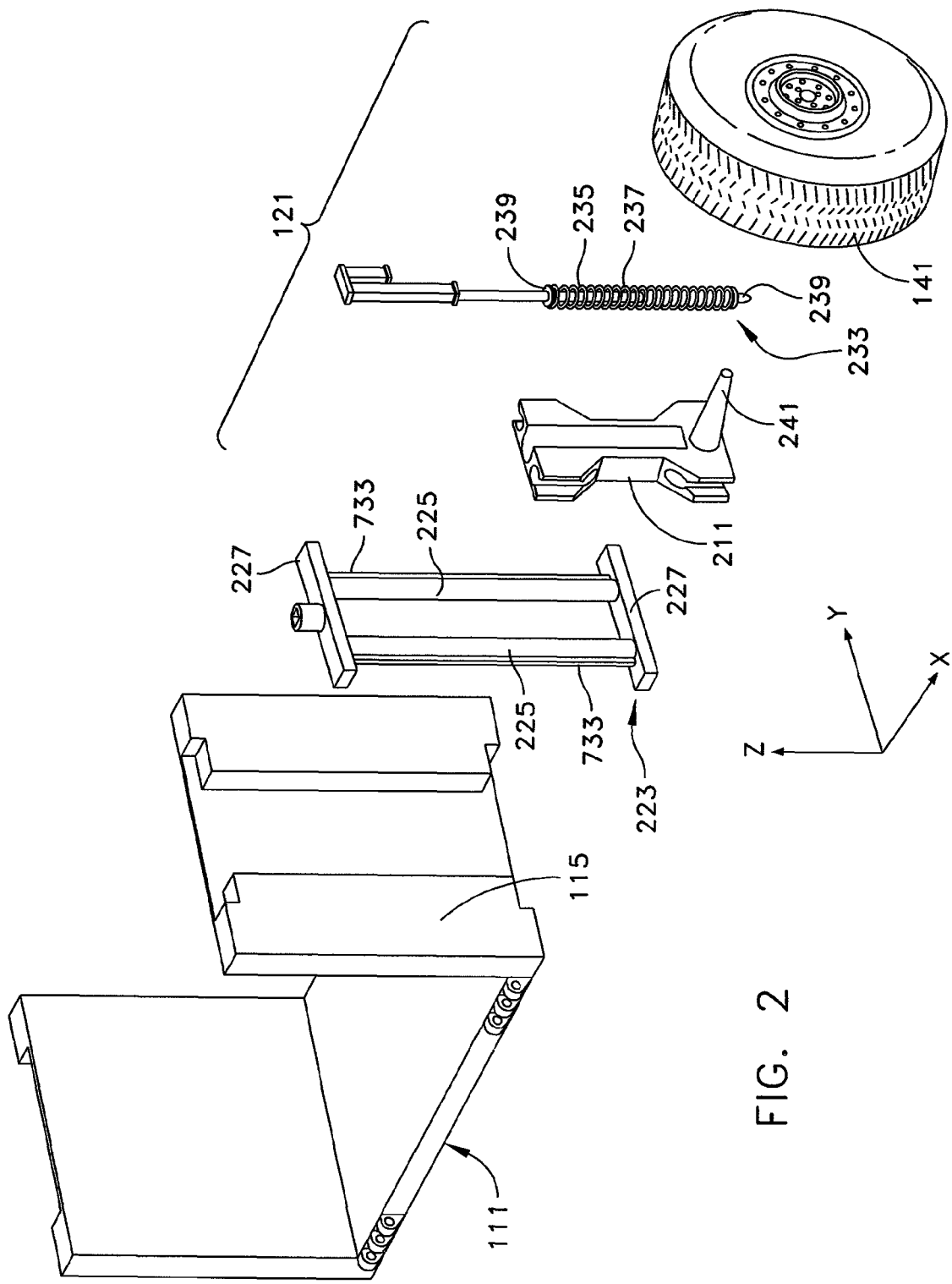
FIG. 2 is a schematic illustration showing a partially exploded view of a suspension system, in accordance with one or more aspects of the present disclosure.

As illustrated in the exploded view of FIG. 2 and in the plan view of FIG. 3, suspension system 101 typically further comprises a linear bearing assembly 121, exemplarily illustrated as comprising a bridge and rail assembly, which is typically secured, or in some cases, coupled to the vertical frame member 115. Linear bearing assembly 121 serves to transfer loads or forces between frame assembly 111 and one or more wheels 141, as any of the one or more wheels travel on a road or terrain 411, as illustrated in FIGS. 4A to 4C. Linear bearing assembly 121 typically comprises a bridge or load support member 211 and rail assembly 223, as well as one or more position biasing assemblies 235, such as a spring. The one or more wheels 141 is typically secured to bridge or load support member 211 through one or more wheel support members, such as, but not limited to, spindles or stub axles 241 such that in use, at least a portion of the weight on or of frame 111 is transferred through the position biasing assembly to bridge 211 and spindle 241 to wheel 141 in contact with a terrain 441.

Rail assembly 223 can comprise one or more rails or pillars 225 that has a longitudinal axis, generally along a longest dimension thereof. Optionally, rail assembly 223 can further comprise one or more trusses 227 securing or coupling two or more rails 225 together and, in some cases, to frame 111. Some preferred configurations of one or more linear bearing assemblies can involve a load support member coupled to one or more rails while being movable along a confined path that is parallel the longitudinal axis. Rail assembly 223 typically comprises rails that are fixed, coupled, or, in some cases, immovable relative to the frame assembly. In other embodiments, the rail assembly can be displaceable along a displacement axis 420 that is coincident along or parallel the longitudinal axis. Typically, rail assembly 223 comprises components that provide a linear displacement axis rather than a curved or arcuate displacement axis.

In some configurations, one or more of the position biasing assemblies can comprise one or more reactive elements 235, such as a coiled spring. Reactive element 235 can have a first end secured to the load support member and a second end secured or coupled to the frame through, for example, vertical frame member 115, rail assembly 223, or both. The second end of reactive element 235 can be coupled to the frame through one or more components of assembly 223. Other embodiments of the reactive elements that can provide a reactive force against a load or weight include, but are not limited to compressed gas or pneumatic springs. In some advantageous configurations, the suspension system can further comprise one or more dampers or dampening elements 237, such as a shock absorber that dampens or modulates shock impulses and facilitates control of the rate of travel of the wheel or the load support member relative to any of assembly 223 and frame 111. Typically, shock absorber 237 has a first end 242 that is coupled, preferably secured, to movable load support member 211 and a second end 243 coupled to fixed frame assembly 111, typically through rail assembly 223. As exemplarily illustrated, reactive element 235 and damper 237 can be arranged in a coil over configuration wherein a shock absorber is disposed within a coiled spring. Hard mounting points, such as spring seat 238 can serve to secure or couple at least one of the reactive element and the dampening element to at least one of the load support member and to the frame. Other embodiments, where advantageous can involve securing an end of any of the reactive element and the dampening element to the frame through one or more components of the rail assembly. For example, the spring can be secured at a first spring end to the movable bridge and be secured at a second spring end to truss 227. Preferred configurations can involve reactive elements that are not secured to any pivoting suspension components. Further configurations can also involve dampening elements that are not secured to a pivoting component nor have a pivot point. Secondary dampening assemblies (not shown) can be coupled to the linear bearing assembly and the frame assembly to provide the dampening characteristics therebetween.

As noted, the bridge is typically reciprocally movable along displacement axis 420. Displacement of the load support member typically occurs as wheel 141 traverses into a depression or over a protrusion of depth or height, d, of terrain 441. The displacement of the bridge from an equilibrium position is typically dependent on the load through the reactive element, typically bearing on the frame, and the force constant, e.g., spring constant or spring rate, of the reactive element, as well as the spring configuration and characteristics of the spring material. For example, the spring constant of a coil spring may be dependent on the spring coil geometry, the elastic modulus of the spring material, and the number of turns or wraps of the coil spring.

Some aspects of the suspension system involve height adjustable features, which can provide independently or separately adjustable frame heights, relative to, for example, terrain 441. For example, suspension system 121 can have at least one positioning assembly 431 that shifts the relative position of the mounting point 238 to a position along a position axis 461 that is typically parallel and coincident the displacement axis and is oriented parallel the longitudinal axis of the one or more rails. As illustrated in FIGS. 5A and 5B, shifting or moving the hard point 238 along the position axis raises or lowers the relative position of the frame relative to the level of the spindle or the wheel support member, which in turn can raise or lower the position of the frame relative to the terrain surface 441. The positioning assembly 431 can be spring positioning assembly which can comprises an actuatable member 511 that is adjustable to be in any position including and between a retracted position R, as illustrated in FIG. 5A, to an extended position E, as illustrated in FIG. 5B. In some cases, however, actuatable member 511 can be configured to be only in the extended position or in the retracted position. Positioning assembly 431 can comprise a pneumatically actuated apparatus, such as a gas inflatable bladder operatively coupled to a source of pressurized gas (not shown) to provide an extension displacement. In other cases, positioning assembly 431 can comprise a hydraulic cylinder and piston assembly or an electrically driven threaded shaft displaceable between retracted and extended positions that positions actuatable member 511 and/or the spring or biasing assembly. The spring positioning assembly can be coupled or secured to any of a rail assembly, a frame assembly and, in some cases, to a load support member, typically through a spring coupled to the load support member.

Figure 8:
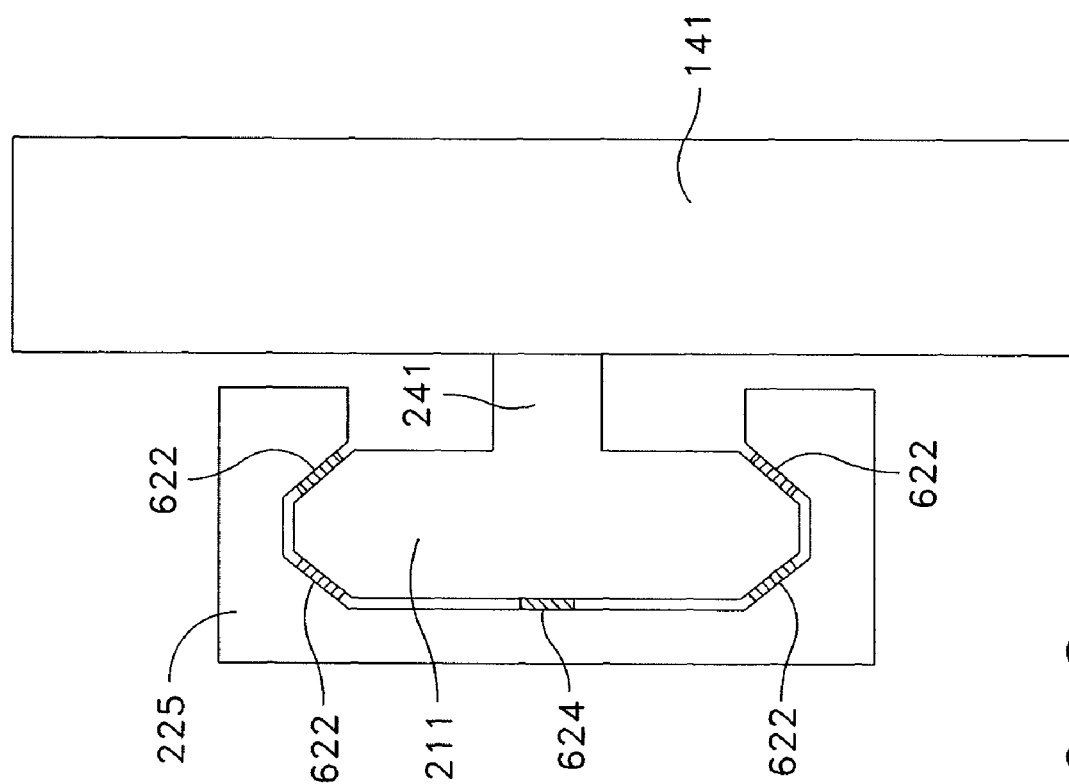
FIG. 8 is a schematic illustration of a portion of a suspension system showing another single rail embodiment, in accordance with one or more embodiments of the present disclosure.

In accordance with some aspects, the linear bearing assembly can be configured to provide uniaxial displacement of the wheel along a confined axis of displacement, i.e., along displacement axis 420. Preferably, the bridge and rail assembly reduces any displacement not coincident with the displacement axis. For example, FIGS. 6 and 8 exemplarily show a rail and bridge assembly utilizable in various suspension systems in accordance with one or more aspects of the disclosure. Load support member 211 can be slidably coupled to a single rail 225 through one or more, typically at least three, bearing subassemblies 622 that reduce sliding friction therebetween. Preferred embodiments, however, can further comprise supplemental bearing assemblies 624 that are also coupled to bridge 211 and facilitate confining translation of the load support member along the preferential displacement axis. Rail 225 and bridge 211 can be co-configured to reduce displacement of the bridge along any direction normal the displacement axis. For example, as illustrated in FIGS. 3 and 6, rail 225 can comprise extending flanges 632 that peripherally surround bridge 211. Flanges 632, typically in conjunction with bearing assemblies 622 and 624, thus confine the bridge to displacements along the displacement axis. Any of bearing assemblies 622 and 624 can utilize any of roller bearings and spherical bearing configurations.

In other configurations, the linear bearing assembly can have at least one confining structure that limits or at least reduces any transverse displacement of the slidable load support member from along other than the displacement or longitudinal axis. For example, rail 225 can have one or more flanges 632 at least partially surrounding load support member 211. In other cases, rail 225 and load support member 211 can comprise complementarily shaped structures that limit displacement of the member 211 along the longitudinal axis of the rail. As illustrated in, for example FIG. 7, two or more rails 225 can be utilized to confine travel of member 211 along the preferred displacement axis. Optional confining structures can involve one or more flanges 723 on member 211 that at least partially surrounds a periphery of rail 225 to reduce any displacement transverse or normal the displacement axis or the longitudinal axis.

Still further aspects can involve suspension systems that utilize reinforcing structures that prevent buckling of components thereof. For example, rail 225 can have a rib 733 longitudinally and peripherally disposed along a lengthwise direction of the rail. Preferred embodiments can further involve rails 225 and bridge 211 formed to have a tongue, such as reinforcing rib 733 (running lengthwise for at least a portion of rail 225) in groove (defined by flanges 723 of bridge 211). One or more rails of the suspension systems can have one or more reinforcing ribs 733. For example, one or both of rails 225 illustrated in FIG. 7 can have two or more ribs 733 disposed on at least a portion of the length rail 225 such that the ribs protrude from the rails perpendicularly from each other.

One or more additional aspects of the present disclosure involve a suspension system comprising a frame assembly, a rail secured to the frame assembly, and a load support member engaged with the vertical rail, wherein the load support member is movable along a longitudinal axis or a displacement of the rail. The suspension system further comprises a spring having a first spring end secured to the load support member, and a second spring end secured to the frame assembly. In particularly configured embodiments, the suspension system can further comprise a shock absorber having a first end secured to the load support member, and a second end secured to the frame assembly. In some embodiments, the suspension system further comprises a wheel secured to the load support member through a stub axle but, in other embodiments, further comprises a seat assembly secured to the load support member.

One or more further aspects of the present disclosure involve a vehicle having a floor surface. The vehicle further comprises a wheel suspension system comprising a suspension frame assembly. The suspension frame assembly comprises a horizontal frame support member with a first end and a surface oriented substantially parallel the floor surface, and at least one vertical frame support member, the at least one vertical support member secured proximate the first end of the horizontal suspension support member. The suspension system can further comprise a bridge secured to the vertical frame support member. The bridge is vertically movable along a longitudinal axis or displacement, axis typically substantially parallel a planar surface of the vertical frame support member. The suspension system further comprises a spring assembly having a first spring end and a second spring end distal from the first spring end. The spring assembly can be secured to the vertically movable bridge at the first spring end and to the vertical frame support member at the second spring end. The suspension system can further comprise a shock absorber having a first end, a second end, the first end of the shock absorber secured or coupled to the vertically movable bridge, and the second end of the shock absorber secured or coupled to the suspension frame assembly. In some configurations, the vehicle further comprises a spring positioning assembly secured to the vertical frame support member. The spring positioning assembly typically comprises a spring seat and an extendable member having a first mounting end secured to the spring seat and a second mounting end secured to the at least one vertical frame support member. The second spring end is typically secured to the spring seat. In some configurations, the vehicle further comprises a suspension control system that is operatively coupled to the spring positioning assembly. The suspension control system is typically configured to adjust an extension displacement of the extendable member between a retracted position and an extended position. In further configurations, the vehicle further comprises a position sensor disposed to provide an indication of a relative position of the bridge along an axis of displacement. The bridge is typically secured to the wheel suspension system without a pivoting member or pivoting element. Preferably, some configurations of the suspension system involve components without a pivoting end or axis. The suspension system can further comprise at least one rail having each end thereof secured to the vertical suspension support member. The bridge is typically secured to the rail and is preferably slidably movable along at least a portion of a length of the rail. The bridge can comprise a plurality of bearing assemblies each disposed against a running surface of the rail.

One or more still further aspects of the present disclosure involve a method of assembling a wheel suspension system. The assembly method comprises securing a vertical frame support member to an end of a horizontal frame support member, securing a rail to the vertical frame support member, installing a bridge to the rail, the bridge movable along a longitudinal axis of the rail or along a displacement axis parallel the longitudinal axis, providing a spring assembly having a first spring end and a second spring end, securing the first spring end to the movable bridge and securing the second spring end to the vertical frame support member, and securing a first end of a shock absorber to the bridge and a second end of the shock absorber to vertical frame support member. The assembly method can further comprise securing a wheel assembly to the bridge.

The control system or controller may be implemented using one or more computer systems. The controller may comprise, for example, a general-purpose computer such as those based on an Intel PENTIUM®-type processor, a Motorola PowerPC® processor, a Sun UltraSPARC® processor, a Hewlett-Packard PA-RISC® processor, or any other type of processor or combinations thereof. Alternatively, the computer system may include specially programmed, special-purpose hardware, for example, an application-specific integrated circuit (ASIC) or controllers intended for analytical systems.

The controller can have one or more processors typically connected to one or more memory devices, which can comprise, for example, any one or more of a disk drive memory, a flash memory device, a RAM memory device, or other device for storing data. The memory device is typically used for storing programs and data during operation of the suspension system and/or the controller. For example, the memory device may be used for storing historical data relating to the parameters over a period of time, as well as operating data. Software, including programming code that implements embodiments of the disclosure, can be stored on a computer readable and/or writeable nonvolatile recording medium, and then typically copied into the memory device wherein it can then be executed by the processor. Such programming code may be written in any of a plurality of programming languages, for example, Java, Visual Basic, C, C#, or C++, Fortran, Pascal, Eiffel, Basic, COBAL, or any of a variety of combinations thereof.

One or more components of the computer system may be coupled by an interconnection mechanism, which may include one or more busses (e.g., between components that are integrated within a same device) and/or a network (e.g., between components that reside on separate discrete devices). The interconnection mechanism typically enables communications (e.g., data, instructions) to be exchanged between components of the system.

The computer system can also have one or more input devices, such as, but not limited to any of a keyboard, mouse, trackball, microphone, touch screen, and the position sensor, and one or more output devices, such as but not limited to any of a printing device, display screen, or speaker. In addition, the computer system may contain one or more interfaces (not shown) that can connect the computer system to a communication network (in addition or as an alternative to the network that may be formed by one or more of the components of the system).

According to one or more embodiments, the one or more input devices 208 may include sensors for measuring parameters of the suspension system. If a plurality of sensors is utilized, a preferred configuration can involve operatively coupling or connecting any of the output or sensors through a communication network to the controller. Coupling any of the sensors to the controller can involve wired or wireless communication configurations.

Typically, the suspension control can provide a drive or output signal to a component of the suspension system. The suspension control system can be open wherein an operator adjusts a position or height of, for example, the load support member, or the linear bearing assembly, to one or more predetermined positions. The suspension control system can be closed that utilizes one or more position sensors that continuously or continually adjusts the positioning assembly to modify the position or height of the load support member or the linear bearing assembly, based at least partially on a set point or desired or predetermined level.

Further configurations of the various assemblies and components of the systems can involve protective barriers or coverings that shield the movable components from dust and other debris, or otherwise contain one or more of the movable components of the systems within, for example, a protective boot.

Having now described some illustrative embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives. For example, various aspects can involve retrofitting existing vehicles or loaded structures to utilize one or more embodiments or advantageous features of the disclosure.

Those skilled in the art should appreciate that the parameters and configurations described herein are exemplary and that actual parameters and/or configurations will depend on the specific application in which the systems and techniques of the disclosure are used. Those skilled in the art should also recognize or be able to ascertain, using no more than routine experimentation, equivalents to the specific embodiments. It is therefore to be understood that the embodiments described herein are presented by way of example only and that, within the scope of the appended claims and equivalents thereto; the invention may be practiced otherwise than as specifically described.

Moreover, it should also be appreciated that the disclosure is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims. Further, acts, elements, and features discussed only in connection with one embodiment are not intended to be excluded from a similar role in other embodiments.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A suspension system, comprising:
   a linear bearing assembly having a rail assembly and a load support member slidably engaged with the rail assembly along a linear displacement axis of the rail assembly; and
   a spring having a first spring end configured to be coupled to the load support member, the spring being at least partially housed within the load support member.

2. The suspension system of claim 1, further comprising a load platform coupled to the load support member.

3. The suspension system of claim 1, further comprising a wheel support member coupled to the load support member.

4. The suspension system of claim 1, further comprising a frame assembly coupled to the linear bearing assembly, the frame assembly having a horizontal frame support member, and at least one vertical frame support member oriented perpendicularly to the horizontal suspension support member.

5. The suspension system of claim 4, wherein the linear bearing assembly is coupled to the frame assembly without a pivoting member.

6. A suspension system comprising:
   a linear bearing assembly having a rail assembly and a load support member slidably engaged with the rail assembly along a linear displacement axis of the rail assembly;
   a spring having a first spring end configured to be coupled to the load support member;
   a frame assembly coupled to the linear bearing assembly, the frame assembly having a horizontal frame support member, and at least one vertical frame support member oriented perpendicularly to the horizontal suspension support member; and
   a shock absorber having a first end configured to be coupled to the load support member, and a second end configured to be coupled to at least one of the frame assembly and the rail assembly;
   wherein the linear bearing assembly is coupled to the frame assembly without a pivoting member.

7. The suspension system of claim 6, further comprising a spring positioning assembly having an actuatable member with an end configured to be coupled to at least one of the frame assembly and the rail assembly.

8. The suspension system of claim 7, further comprising a suspension control system operatively coupled to the spring positioning assembly, the suspension control system configured to adjust an extension position of the actuatable member between a retracted position and an extended position.

9. The suspension system of claim 8, further comprising a position sensor disposed to provide an indication of a relative position of the load support member along the linear displacement axis.

10. A suspension system comprising:
    a wheel support member;
    a linear bearing assembly having a linear guide member and a load support member coupled to the linear guide member and slidable along a linear axis of the linear guide member;
    a spring having a first spring end configured to be coupled to the wheel support member; and
    a shock absorber configured to be coupled to the wheel support member.

11. The suspension system of claim 10, further comprising adjusting means for adjusting a displacement of at least one of the linear bearing assembly and the load support member.

12. The suspension system of claim 11, further comprising a frame configured to be coupled to the linear bearing assembly.

13. A method of assembling a suspension system comprising:
    providing a linear bearing assembly having no pivoting members and comprising
      a rail assembly,
      a load support member slidably coupled to the rail assembly, the load support member movable along a linear displacement axis of the rail assembly,
      a shock absorber having a first end and a second end, the first end configured to be coupled to the load support member; and
    a spring assembly having a first spring end and a second spring end, the first spring end configured to be coupled to the load support member.

14. The method of claim 13, further comprising providing the load support member with a wheel support member.

15. The method of claim 14, further comprising:
    providing a frame assembly;
    coupling the second spring end to at least one of the frame assembly and the rail assembly; and
    coupling the second end of the shock absorber to at least one of the frame assembly and the rail assembly.

16. The method of claim 15, further comprising coupling a spring positioning assembly to at least one of the rail assembly and the frame assembly.

17. The method of claim 16, further comprising coupling a spring position controller to the spring positioning assembly.

18. The method of claim 17, further comprising coupling the spring position controller to at least one suspension position sensor, the at least one suspension position sensor configured to provide an indication of a position of at least one of the load support member, the first spring end, the second spring end, and the wheel.

19. The suspension system of claim 6, further comprising a load platform coupled to the load support member.

20. The suspension system of claim 6, further comprising a wheel support member coupled to the load support member.

* * * * *